Feb. 27, 1934.   H. W. CLAUSEN   1,949,040
APPARATUS FOR RECEIVING AND DISPENSING BLOCKS OF ICE
Filed Feb. 14, 1933   3 Sheets-Sheet 1
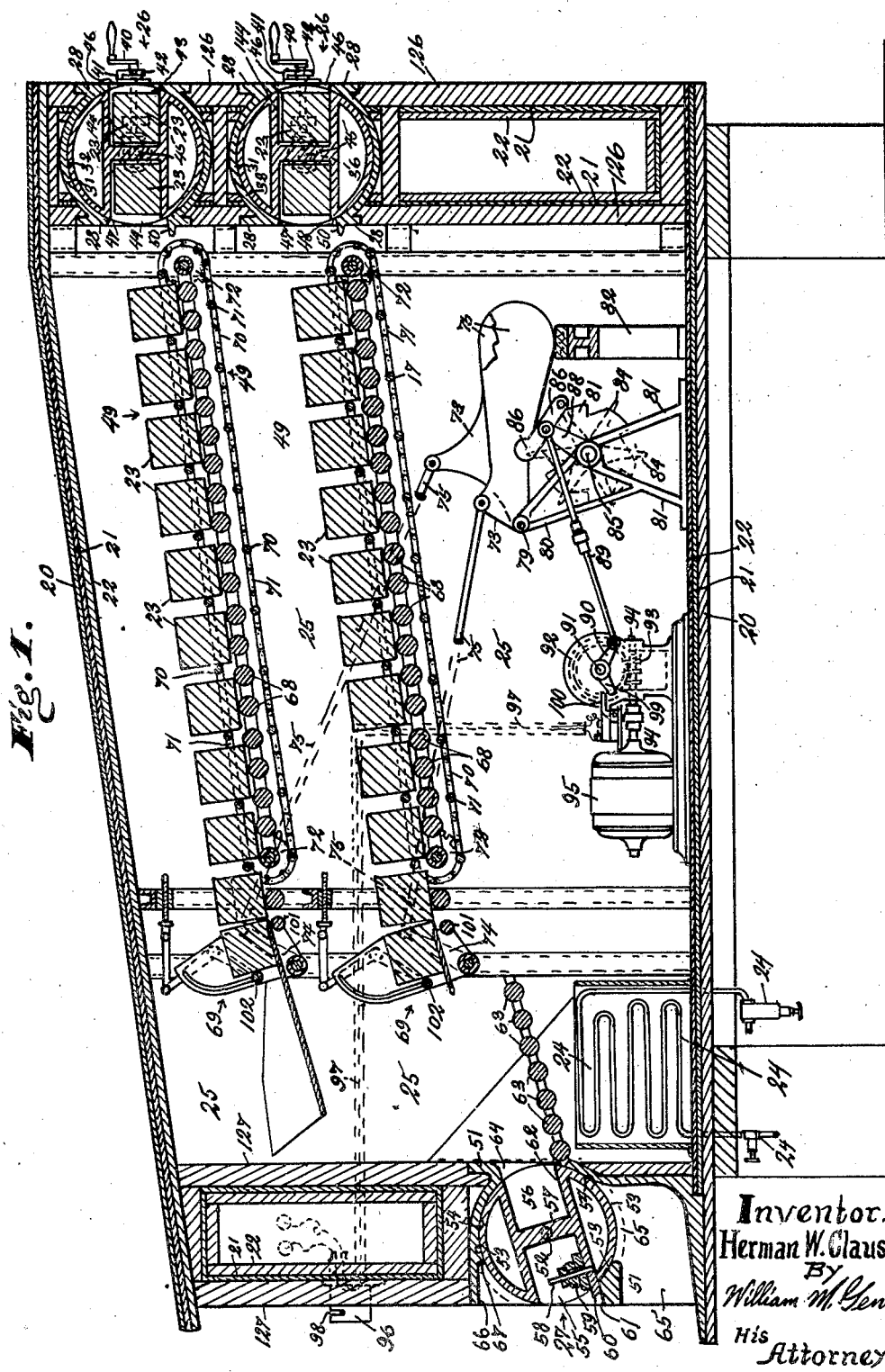
Inventor.
Herman W. Clausen
By
William M. Gentle
His Attorney.

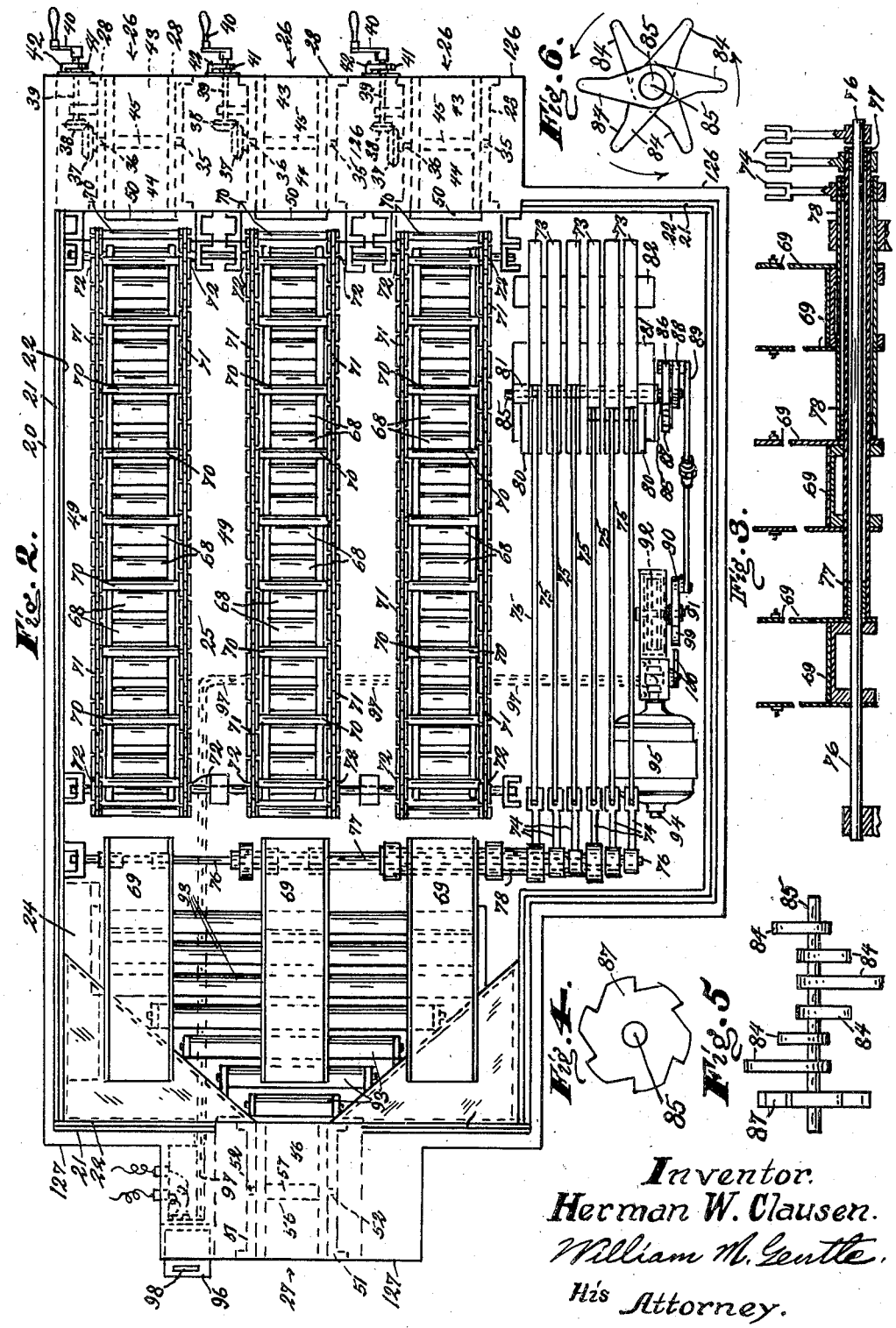
Feb. 27, 1934.  H. W. CLAUSEN  1,949,040
APPARATUS FOR RECEIVING AND DISPENSING BLOCKS OF ICE
Filed Feb. 14, 1933  3 Sheets-Sheet 2
Inventor.
Herman W. Clausen.
William M. Gentle.
His Attorney.

Feb. 27, 1934. H. W. CLAUSEN 1,949,040
APPARATUS FOR RECEIVING AND DISPENSING BLOCKS OF ICE
Filed Feb. 14, 1933  3 Sheets-Sheet 3
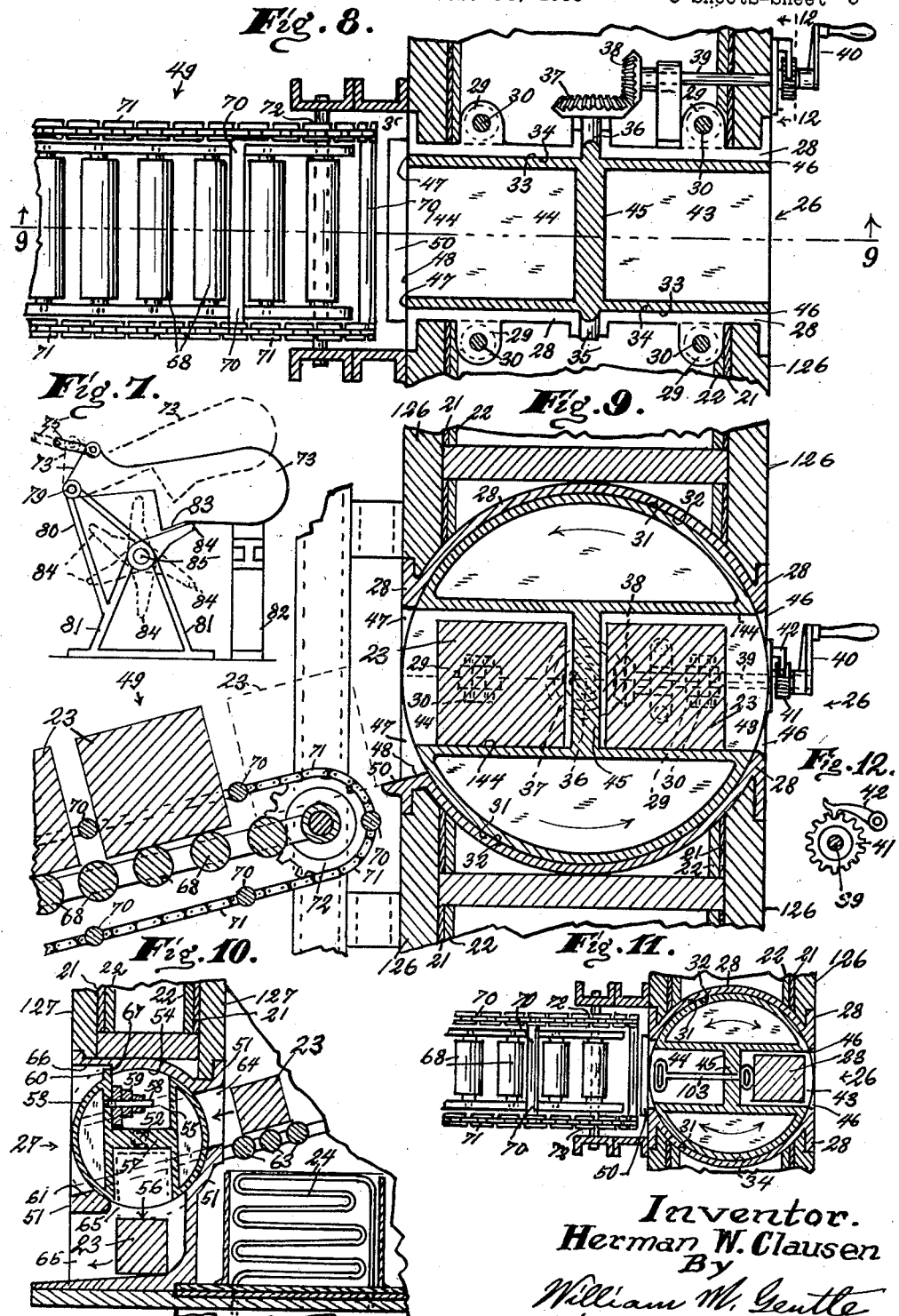
Inventor.
Herman W. Clausen
By
William M. Gentle
His Attorney.

Patented Feb. 27, 1934

1,949,040

UNITED STATES PATENT OFFICE 1,949,040

APPARATUS FOR RECEIVING AND DISPENSING BLOCKS OF ICE

Herman W. Clausen, Los Angeles, Calif., assignor of one-half to Peter C. Clausen, Los Angeles, Calif.

Application February 14, 1933. Serial No. 656,716

5 Claims. (Cl. 312—35)

This invention relates to an apparatus for receiving and dispensing blocks of ice, and it is an improvement on application filed December 21, 1931, Serial No. 582,344 by Herman W. Clausen and Peter C. Clausen, joint inventors, and this improvement has been invented solely by Herman W. Clausen, one of the above inventors, and a half interest therein assigned to Peter C. Clausen.

The principal object of this invention is to provide a relatively airtight enclosure that can be kept at a temperature slightly below freezing. To that end I provide an enclosure that has its walls properly lined with material that will effectively resist the passage of air and heat, with inlet and outlet passages through the walls that are effectively sealed by pivotally mounted doors that effectively prevent the passage of warm outer air into the enclosure either when it is being charged with blocks of ice or when they are passed one at a time from the interior to the outside of the enclosure as when they are delivered one at a time to purchasers. That is, I provide revolving doors for charging the apparatus that have oppositely arranged recesses adapted to receive blocks of ice when their open ends are open to the outer air; and to discharge them onto the conveyors when their open ends are open to the interior of the apparatus. These doors are operated without carrying sufficient air or heat into the enclosure or cold air out of it to materially change the temperature therein.

I also provide a delivery door adjacent the discharge end of the conveyors that is arranged to receive the blocks of ice one at a time and consecutively from the conveyors, and by gravity discharge them from the interior to the exterior of the apparatus, and this discharge of the blocks of ice is accomplished without carrying sufficient warmer air into the apparatus or cold air out of it to materially affect the temperature therein.

A feature of invention is shown in constructing the inlet doors so that after moving the blocks of ice from the exterior to the interior of the apparatus they automatically discharge them onto the take-on ends of their respective conveyors.

Another object of the invention is to provide a rocking discharge door adjacent the discharge end of a plurality of conveyors that receives from each singly and in a consecutive order blocks of ice that are automatically and by gravity discharged from the interior of the apparatus to the outside thereof without causing sufficient air to enter or discharge from the enclosure to materially change the temperature therein.

Features of invention are shown in the construction, combination and arrangement of parts whereby an apparatus for receiving and dispensing blocks of ice is provided that is easy to construct, durable in use, and effective to maintain a relatively uniform temperature therein. I also provide an apparatus that is constructed and operated without springs either in the interior or exterior of the enclosure. As is well known, springs are easily broken when subjected to freezing temperature, and an object is to avoid such breakage.

Other objects, advantages and features of invention may appear from the accompanying drawings, the subjoined detailed description and the appended claims.

The accompanying drawings illustrate the invention, in which:

Figure 1 is a central vertical longitudinal section through the apparatus showing an airtight enclosure with doors for delivering blocks of ice into and discharging them from the apparatus, with some parts indicated diagrammatically and others shown fragmentally.

Fig. 2 is a plan view of the apparatus with the lid or roof removed, parts indicated diagrammatically and the inlet and outlet doors indicated by dotted lines.

Fig. 3 is a fragmental central longitudinal section through one set of the interior delivery gates and means for operating them, parts omitted for the sake of clearness in the drawing.

Fig. 4 is a side view of a ratchet wheel used for opening the delivery gates.

Fig. 5 is a plan view of the arms for lifting the weight levers and shaft on which they are mounted.

Fig. 6 is an end view of the shaft and arms shown in Fig. 5.

Fig. 7 is a view analogous to Fig. 6 with additional parts illustrating how one of the arms actuates its respective weighted lever to operate a gate.

Fig. 8 is a fragmental sectional view through one of the airtight inlet doors showing in detail how it is mounted in the rear wall and operated to deliver blocks of ice from the outside to the inside of the enclosure, and also showing a plan view of its associated elevator.

Fig. 9 is a fragmental section on line 9—9, Fig. 8, further illustrating the detailed construction of the relatively airtight rotary inlet doors and their respective conveyors, illustrating how the housings of the doors are cut away so that the blocks of ice are automatically discharged from the compartments in the doors onto the take-on ends of the conveyors.

Fig. 10 is a fragmental sectional view analogous to the lower left hand corner of Fig. 1 illustrating how the blocks of ice discharge by gravity through the rocking door without causing a material change of temperature within the enclosure.

Fig. 11 is a fragmental section analogous to that shown in Fig. 8 on a smaller scale and parts omitted illustrating how the blocks of ice can be manually discharged from the compartments in the rotary doors onto the take-on ends of their respective conveyors.

Fig. 12 is a fragmental section on line 12—12, Fig. 8, showing the dog and pinion for holding the rotary inlet doors from rotation when not in use.

In detail the springless apparatus includes an enclosure 20 with roof, floor and walls formed of material that resists the passage of air and heat, and they are lined with heat insulating material 21 and 22, as best illustrated in Figs. 1 and 2.

The temperature within the enclosure is maintained at a degree slightly below freezing so that the ice blocks 23 therein will be prevented from melting. A refrigerating plant fragmentally illustrated in Figs. 1 and 2 of any suitable type can be used for maintaining this temperature. As the refrigerator 24 forms no part of this invention it is indicated diagrammatically in the drawings.

As an aid to maintaining the temperature in the ice chamber 25 at a relatively constant degree, I provide the rear rotary inlet doors 26 through which the apparatus is charged with blocks of ice, and a rocking front delivery door 27 through which the blocks of ice in chamber 25 can be removed therefrom without admitting sufficient outside air to materially change the temperature therein.

There are six of the rear doors 26 in the rear wall 126 that are constructed and operated substantially alike so that a description of one will describe all of them; and the detailed construction and operation of these doors are shown best in Figs. 8 and 9.

As seen therein, each has a split housing 28 that is in the form of two semicylindrical shells that are secured together by lugs and bolts 29, 30 over the cylindrical drum-like door 26 so that the outer periphery 31 of the door is in sliding contact with the inner periphery 32 of the split housing; and also so the side walls 33 of the door slidingly engage the inside walls 34 of the housing.

The revolving door 26 is provided with spindles 35, 36 that are pivotally mounted in the walls 34 so the door can be rotated within the housing. The spindle 36 is extended so the bevel gear 37 can be secured to it in position to engage the bevel gear 38 on the shaft 39 that is adapted to be rotated by the crank arm 40 when the door 26 is to be actuated.

As best shown in Fig. 12, the shaft 39 is provided with a pinion 41 that is engaged by the dog 42 when the door 26 is to be held from rotation.

The door 26 is provided with oppositely arranged compartments 43 and 44 that are separated by a center partition 45. They have open ends so they can be charged with cubical blocks of ice when in register with the outer opening 46 in the housing 28; and out of which they can be either automatically or manually discharged when in register with the opening 47 in the housing.

The opening 47 is enlarged at 48 so the blocks of ice 33 can automatically slide out of the compartments 43 and 44 onto the take-on end of the conveyor 49 when the surfaces 143 and 144 of the compartments are in register with the top surface of the ledge 50 that is extended downwardly and outwardly from the opening 47.

As previously stated, there are six of the doors 26 arranged in the rear wall of the enclosure adjacent the take-on end of their respective conveyor so they can be operated to charge the apparatus with blocks of ice without admitting sufficient outside air to the enclosure to materially change the temperature therein.

The rocking discharge door 27 is arranged in the front wall 127 of the apparatus centrally to the conveyors and adjacent their front ends so that blocks of ice singly and in consecutive order from all of them can be discharged from the apparatus. The door 27 is also provided with a split housing 51 in which it is pivotally mounted on spindles 52 so it can rock in an arc with its peripheral surface 53 slidingly engaging the inner periphery 54 of the housing 51, and the side walls of this housing are in smooth contact with the side walls of the rocking door. That is, this door can rock on the spindles 52 to discharge blocks of ice from the interior to the exterior of the apparatus without admitting outside air to the interior to materially change the temperature therein. The door 27 is provided with oppositely arranged outer and inner chambers 55, 56 that are separated by a center wall 57.

A pin 58 is arranged in the chamber 55 so that weights 59 can be placed thereon to over-balance the door and normally hold the lug 60 thereon engaged with the lower stop 61; and also hold the door so the floor 62 in the chamber 56 is aligned with the top inclined surface of the floor of rollers 63 so that a block of ice delivered from any of the conveyors 49 will automatically slide into the chamber 56 through the opening 64 in the split housing 51.

When a block of ice enters the chamber 56 it will overcome the weight 59 in the chamber 55 so the door will rock on its pivot to move the open end of the chamber 56 into register with the discharge outlet 65 in the housing 51 so the block of ice therein will discharge by gravity from the chamber.

The housing 51 is recessed at 66 to form an upper stop 67 that is engaged by the lug 60 when the open end of the chamber 56 is in register with the opening 65. It is obvious that the weight 59 will return the door 27 to its normal position when the block of ice falls by gravity from the chamber 56.

The mechanism for delivering the blocks of ice from the inlet doors to the discharge door is practically the same in this application as in the application hereinbefore mentioned, except as to minor changes that are necessary in view of the changes in the construction of the doors.

The six inclined conveyors 49 have their take-on ends arranged adjacent their respective doors 26 for the purpose heretofore described. They are inclined downwardly toward the front door 27 so that blocks of ice 23 will move downwardly on the rollers 68 toward the gates 69 that are arranged at the discharge end of the conveyor.

The blocks of ice 23 are separated by spaced rollers 70 that are carried by pairs of chains 71 on the sprocket wheels 72 at opposite ends of the conveyors.

The gates 69 are singly and successively actuated by the weighted levers 73 that are connected to the gate levers 74 by rods 75. The gate levers 74 are connected to their respective shafts 76, 77 and 78 which in turn are secured to their respective gates 69, as best shown in Figs. 1 and 3.

The weighted levers 73 are pivotally mounted at their forward ends on the shaft 79 that is mounted in the extension 80 to the bearing stand 81; and their rear weighted ends normally rest on the stand 82. These levers 73 have cam surfaces 83 that are engaged by their respective cam fingers 84 on the cam shaft 85 that is mounted in the stand 81 and intermittently rotated by the ratchet wheel and dogs 86 and 87; see Figs. 1, 2 and 7.

The shaft 85 has a lever 88 that is connected by a rod 89 to a crank 90 on a shaft 91 that carries a worm gear 92 that is driven by a worm 93 on the shaft 94 of the motor 95 shown in Fig. 1, so that when the motor is driven it will actuate the parts heretofore described to open one of the gates 69 and release a block of ice. The other gates are actuated successively in a like manner.

The means for starting and stopping the motor 95 so it will give the shaft 91 a single turn is illustrated diagrammatically in Figs. 1 and 2; and as seen therein there is a coin controlled electrical switch box 96 at the front of the apparatus that is in circuit with another switch adjacent the motor 95 through the wires 97 shown by dotted lines.

When a suitable coin is deposited in the box 96 through the slot 98 the motor will be started to drive the shaft 91 and at the end of a complete revolution of this shaft the arm 99 thereon will engage the switch lever 100 and stop the motor, thereby actuating one of the weight levers 73 separately and consecutively to operate its respective gate 69. When a gate 69 is actuated to deliver a block of ice to the door 27 it will lift its rear roller 101 to hold back the other blocks of ice and also lift its front roller 102 to release the block of ice that is within the gate.

As illustrated in Fig. 11, the doors 26 can be provided with double-handled double acting push rods 103 that are slidably mounted in the center partitions 45 so that the blocks of ice 23 can be manually forced out of the compartments 43, 44 onto the elevators 49 if so desired.

From the foregoing it can be readily seen that the conveyors 49 can be loaded with blocks of ice through the rear doors 26, and the blocks of ice discharged from the apparatus through the rocking door 27 without admitting sufficient outside air into the chamber 25 to materially change the temperature therein, thereby simplifying the matter of maintaining a uniform temperature slightly below freezing within the enclosure.

Also by making the apparatus entirely springless I avoid the necessity of frequently opening up the chambers 25 to the outside air for the purpose of replacing broken springs.

I claim as my invention:

1. An apparatus for dispensing blocks of ice including an enclosure having walls constructed to resist the passage of air and heat therethrough, means for storing blocks of ice in said enclosure, a split door frame in said opening, a door pivotally mounted in said frame that has oppositely arranged outer and inner chambers therein, upper and lower stops in said frame, a lug on said door, weights in the outer chamber of said door for normally holding said lug in engagement with said lower stop so that the inner chamber of said door is in position to receive blocks of ice from the interior of said enclosure, and means for delivering blocks of ice separately and consecutively to the inner chamber of said door so that when a block of ice is so delivered its weight will cause said door to revolve until said lug engages said upper stop and thereby holds the door stationary until the block of ice automatically discharges from the chamber to the exterior of the enclosure.

2. An apparatus for dispensing blocks of ice including an enclosure having walls constructed to resist the passage of air therethrough and having a discharge opening in the front wall thereof, a split housing in said opening that has a passage therethrough, a rocking door pivotally mounted in said passage that has oppositely arranged outer and inner chambers therein, upper and lower stops on said frame, a lug on said door, adjustable weights in the outer chamber of said door for normally holding said lug engaged with said lower stop so that the opening of said inner chamber is in register with the inlet end of said passage, means for delivering blocks of ice separately and consecutively to the inner chamber of said door when in register with the inlet of said passage, said parts arranged so that the weight of a block of ice will rock said door to a discharging position in which said lug will engage said stop to hold the door stationary while the block of ice automatically discharges to the exterior of the enclosure, after which the weights of the outer chamber will return said door to its normal position.

3. In an apparatus for receiving and dispensing blocks of ice, the combination with an enclosure having walls constructed to resist the passage of air and heat therethrough and having an inlet opening through the rear wall thereof, of a split frame secured in said opening, an inlet door pivotally mounted in said frame that has oppositely arranged compartments therein so that when one of said compartments is open to the outer air the other is open to the interior of said enclosure, said compartments being adapted to receive blocks of ice, means for rotating said door so as to transfer a block of ice from the outside to the inside of said enclosure without materially altering the temperature therein, and manual means for discharging the blocks of ice from the compartments in said door.

4. The combination set forth in claim 3 with a conveyor within said enclosure with its take-on end arranged adjacent said inlet door, and means whereby the blocks of ice when moved from the outside to the inside of said enclosure are automatically discharged from said door onto the take-on end of said conveyor.

5. In an apparatus for dispensing blocks of ice the combination with an enclosure having walls constructed to resist the passage of air therethrough and having a discharge outlet therefrom, a split frame in said outlet having a passage therethrough, a rocking door pivotally mounted in the passage through said frame, said door having oppositely arranged outer and inner chambers therein, upper and lower stops on said frame, a lug on said door, adjustable weights in said outer chamber for normally holding said lug engaged with said lower stop so that the opening into said inner chamber is in register with the inlet end of said passage and in position to receive a block of ice, of a plurality of inclined conveyors in said enclosure on which blocks of ice are stored, a delivery gate at the end of each conveyor, and means for actuating each gate separately and in a consecutive order to discharge the blocks of ice singly into the inner chamber of said door so they will discharge by gravity from said enclosure without materially changing the temperature therein.

HERMAN W. CLAUSEN.